US009301048B2

(12) United States Patent
Sugiyama

(10) Patent No.: US 9,301,048 B2
(45) Date of Patent: Mar. 29, 2016

(54) SIGNAL PROCESSING METHOD, SIGNAL PROCESSING DEVICE, AND SIGNAL PROCESSING PROGRAM

(71) Applicant: NEC Corporation, Tokyo (JP)

(72) Inventor: Akihiko Sugiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 140 days.

(21) Appl. No.: 14/280,081

(22) Filed: May 16, 2014

(65) Prior Publication Data

US 2014/0247949 A1    Sep. 4, 2014

Related U.S. Application Data

(62) Division of application No. 11/667,109, filed as application No. PCT/JP2005/020319 on Nov. 4, 2005, now Pat. No. 8,761,385.

(30) Foreign Application Priority Data

Nov. 8, 2004    (JP) ................. 2004-323908

(51) Int. Cl.
*H04R 3/00*        (2006.01)
*H04M 9/08*        (2006.01)
*H04R 3/04*        (2006.01)
*H04B 3/23*        (2006.01)
*G10K 11/00*       (2006.01)

(52) U.S. Cl.
CPC .............. *H04R 3/002* (2013.01); *G10K 11/002* (2013.01); *H04B 3/234* (2013.01); *H04M 9/082* (2013.01); *H04R 3/04* (2013.01); *H04R 2410/05* (2013.01)

(58) Field of Classification Search
None
See application file for complete search history.

(56) References Cited

U.S. PATENT DOCUMENTS 7,359,504 B1 *   4/2008   Reuss ................... H04M 9/082
                                                      379/406.01

FOREIGN PATENT DOCUMENTS

| JP | 3-218150 A | 9/1991 |
| JP | 4-271622 A | 9/1992 |
| JP | 6-13940 A  | 1/1994 |
| JP | 6-14100 A  | 1/1994 |
| JP | 7-226793 A | 8/1995 |

(Continued)

OTHER PUBLICATIONS

"A New Class of Doubletalk Detectors Based on Cross-Correlation", Jacob Benesty, et al., IEEE Transactions on Speech and Audio Processing, vol. 8, No. 2, pp. 168-172, Mar. 2000.

(Continued)

*Primary Examiner* — Curtis Kuntz
*Assistant Examiner* — Kenny Truong
(74) *Attorney, Agent, or Firm* — McGinn IP Law Group, PLLC

(57) ABSTRACT

A signal processing method operating to generate a target blocked signal in which a target signal is suppressed by processing a mixed signal with a first set of adaptive filters, the method including estimating a noise contained in the mixed signal to determine an estimated noise, detecting a target signal contained in the mixed signal using a value that corrected similarity with a reference signal and the mixed signal by the estimated noise to determine a value corresponding to a reliability in the detection, and adaptively controlling a degree of coefficient update for first and second sets of adaptive filters according to the value corresponding to the reliability.

11 Claims, 6 Drawing Sheets

(56) References Cited

FOREIGN PATENT DOCUMENTS

| JP | 7-250397 A | 9/1995 |
|---|---|---|
| JP | 7-264103 A | 10/1995 |
| JP | 7-288493 A | 10/1995 |
| JP | 7-303070 A | 11/1995 |
| JP | 8-256089 A | 10/1996 |
| JP | 10-3298 A | 1/1998 |
| JP | 10-41858 A | 2/1998 |
| JP | 10-229354 A | 8/1998 |
| JP | 10-304489 A | 11/1998 |
| JP | 11-215033 A | 8/1999 |
| JP | 2000-324233 A | 11/2000 |
| JP | 2002-359580 A | 12/2002 |
| JP | 2002-368891 A | 12/2002 |
| JP | 2003-101445 A | 4/2003 |
| JP | 2004-40161 A | 2/2004 |
| JP | 2004-517579 A | 6/2004 |

OTHER PUBLICATIONS

"Adaptive Signal Processing", Benard Widrow and Samuel D. Stearns, Prentice-Hall Inc., USA, 1985.

"Adaptive Filters: Structures, Algorithms, and Applications", Michael L. Honig and David G. Messerschmitt, Kluwer Academic Publishers, USA, 1985.

"Acoustic Echo Control", Christina Breining, et al., IEEE Signal Processing Magazine, Jul. 1999.

Japanese Office Action dated Jun. 16, 2010, with partial English translation.

Sugiyama, et al., "Noise-robust double-talk detection based on normalized cross-correlation and a noise offset", Acoustics, Speech, and Signal Processing, 2005. Proceedings. (ICASSP '05). IEEE International Conference, Issue Date: Mar. 18-23, 2005, vol. 3, pp. iii/156 vol. 3. Print ISBN: 0-7803-8874-7.

Sugiyama, "An interference-robust stochastic gradient algorithm with gradient-adaptive step-size", Acoustics, Speech, and Signal Processing, 1993. ICASSP-93.,1993 IEEE International Conference, Issue Date: Apr. 27-30, 1993, vol. 3, pp. 539-542 vol. 3. Location: Minneapolis, MN.

Ye, et al., "A new double-talk detection algorithm based on the orthogonality theorem", Communications, IEEE Transaction on Issue Date: Nov. 1991, vol. 39 Issue: 11, pp. 1542-1545.

Kato, et al., "A family of 3GPP-standard noise suppressors for the AMR codec and the evaluation results", Acoustics, Speech, and Signal Processing, 2003. Proceedings. (ICASSP '03). 2003 IEEE International Conference, Issue Date: Apr. 6-10, 2003, pp. 1-916-1-919 vol. 1.

United States Office Action dated Jul. 11, 2012 in the U.S. Appl. No. 11/667,109.

United States Office Action dated Dec. 29, 2011 in the U.S. Appl. No. 11/667,109.

United States Notice of Allowance dated Feb. 10, 2014 in the U.S. Appl. No. 11/667,109.

* cited by examiner

SIGNAL PROCESSING METHOD, SIGNAL PROCESSING DEVICE, AND SIGNAL PROCESSING PROGRAM

The present Application is a Divisional Application of U.S. patent application Ser. No. 11/667,109, filed on May 7, 2007, which is based on and claims priority to Japanese Patent Application No. 2004-323908, filed on Nov. 8, 2004, and which claims priority to International Application No. PCT/JP2005/020319, filed on Nov. 4, 2005, the entire contents of each of which are incorporated herein by reference.

TECHNICAL FIELD

The present invention relates to a signal processing method, a signal processing device, and a signal processing program, and particularly to a signal processing method, a signal processing device, and a signal processing program capable of providing high performance of removing interfering signals in an environment having mixed sounds superposed with interfering signals such as echoes or noises.

BACKGROUND ART

Several kinds of interfering signals superposed over a target signal include a line echo generated in a two-wire-to-four-wire converter circuit in a communication line, an acoustic echo generated by acoustic coupling between a speaker for reproducing acoustic signals and a microphone, a background noise or voice of other people getting into a microphone for catching a target signal.

In a two-wire-to-four-wire converter circuit, there is a known technique for removing an echo leaking from a transmitter to a receiver on the four-wire side, such as for example, an echo canceller as described in Non-patent Document 1. The echo canceller is operated to suppress an echo leaking from a transmitter circuit to a receiver circuit on the four-wire side in a two-wire-to-four-wire converter circuit by using an adaptive filter having a number of tap coefficients, which number is equal to or more than the length of an impulse response of an echo path, to generate a pseudo echo (echo replica) corresponding to a transmitted signal.

On the similar principle, another technique is known for removing an acoustic echo generated by acoustic coupling between a speaker for reproducing an acoustic signal and a microphone, such as an acoustic echo canceller as described in Non-patent Document 2. The acoustic echo canceller is operated to suppress an echo leaking from a speaker to a microphone due to acoustic coupling between the speaker and microphone by using an adaptive filter having a number of tap coefficients, which number is equal to or more than the length of an impulse response of an echo path, to generate a pseudo echo (echo replica) corresponding to a transmitted signal.

In such echo cancellers, the tap coefficients of the adaptive filter are modified by correlating a transmitted signal with an error signal obtained by subtracting a pseudo echo from a mixed signal containing an echo and a received signal together. Typical and commonly used algorithms for modifying coefficients of an adaptive filter are an LMS algorithm described in Non-patent Document 1, and a normalized LMS (NLMS) algorithm described in Non-patent Document 3.

FIG. 12 is a block diagram showing an exemplary configuration of a conventional acoustic echo canceller. A reference signal x(k) supplied to an input terminal 1 is transmitted to a speaker 2, where it is emitted as an acoustic signal into an acoustic space. The symbol k is a subscript denoting a time. A microphone 3, which is for catching a near-end acoustic signal v(k), also catches an echo y(k) generated from the acoustic signal emitted by the speaker 2, and transmits it to a subtractor 6.

The reference signal x(k) is also supplied to an adaptive filter 5, which outputs a pseudo echo y(k) hat. This y(k) hat is supplied to the subtractor 6 to subtract it from the signal supplied by the microphone 3, yielding an echo-free signal e(k):

$$e(k)=v(k)+y(k)-y(k)\text{hat}. \quad (1)$$

The value e(k) obtained by the equation above is transmitted to an output terminal 4 as an output. In EQ. (1), y(k)−y(k) hat is called a residual echo.

Assuming the aforementioned LMS algorithm, an m-th coefficient $w_m(k)$ of the adaptive filter 5 is updated according to:

$$w_m(k+1)=w_m(k)+\mu \cdot e(k) \cdot x_m(k). \quad (2)$$

EQ. (2) can be rewritten for all N coefficients in a matrix form as:

$$W(k+1)=W(k)+\mu \cdot e(k) \cdot X(k), \quad (3)$$

where W(k) and X(k) are given by:

$$W(k)=[w_0(k)w_1(k)\ldots w_{N-1}(k)]^T, \text{ and} \quad (4)$$

$$X(k)=[x_0(k)x_1(k)\ldots x_{N-1}(k)]^T. \quad (5)$$

A coefficient updating circuit 7 calculates the second term on the right-hand side of EQ. (2) on receipt of the reference signal x(k) and echo-free signal e(k). The adaptive filter 5 updates coefficients on receipt of the second term on the right-hand side of EQ. (2) supplied by the coefficient updating circuit 7. On the other hand, the NLMS algorithm updates coefficients according to EQ. (6) below, instead of EQ. (3):

$$W(k+1)=W(k)+(\mu/N\sigma_x^2) \cdot e(k) \cdot X(k), \quad (6)$$

where $\sigma_x^2$ is an average electric power of the reference signal x(k) input to the adaptive filter 5. $N\sigma_x^2$ is used for achieving stable convergence by making the value of the step size μ inversely proportional to the average electric power. There are several methods for calculating $N\sigma_x^2$, and one of them involves adding all $x^2$(k) for N preceding samples, for example.

As given by EQ. (1), the echo-free signal e(k) contains a residual echo y(k)−y(k) hat required in updating coefficients, and in addition to that, a near-end voice signal v(k). The signal v(k) acts as a signal interfering with coefficient update, and may sometimes lead to failure in coefficient update if it is unignorable relative to the residual echo. Thus, in general, a double-talk detector circuit 8 is used to detect the presence of the near-end voice v(k), and a result of the detection is used to control coefficient update. The output of the double-talk detector circuit 8 is transmitted to a switch 9, which opens a circuit from the coefficient updating circuit 7 to the adaptive filter 5 if a double talk is detected (i.e., a near-end voice is present), thereby temporarily stopping coefficient update.

A first conventional technique of double-talk detection is disclosed in Patent Document 1. The first conventional technique detects a double talk by level comparison between a microphone signal and a reference signal if the amount of echo cancellation calculated from the microphone signal and an error signal is smaller than a first threshold, and detects a double talk using a cross-correlation between the reference signal and microphone signal if the amount is greater than the first threshold. However, it is not easy to select an appropriate threshold in advance for all cases.

A second conventional technique is disclosed in Patent Document 2. The second conventional technique detects a double talk using an auto-correlation of an error signal and an auto-correlation of a reference signal. In this configuration, the echo canceller itself is multiplexed to make power comparison between a plurality of error signals corresponding to a plurality of adaptive filter outputs. Thus, a plurality of adaptive filters are required, thus increasing computational complexity.

A third conventional technique is disclosed in Patent Document 3. The third conventional technique requires a plurality of sets of adaptive filter coefficients, thus raising a problem that a required memory size is increased.

A fourth conventional technique is disclosed in Patent Document 4. The fourth conventional technique detects a double talk and system variation undiscriminatingly by comparing, with a threshold, a power ratio between an error and a reference signal, a power ratio between a microphone signal and a reference signal, or a power ratio between an error and a pseudo echo, and further detects a double talk by comparing, with a threshold, a value obtained by normalizing a correlation between the error and pseudo echo by a power of the pseudo echo.

A fifth conventional technique is disclosed in Patent Document 5. The fifth conventional technique involves double-talk detection using a correlation or covariance of signals caught by a plurality of microphones. Therefore, this technique requires a plurality of microphones and is not applicable to a system comprising a single microphone.

A sixth conventional technique is disclosed in Patent Document 6. The sixth conventional technique conducts double-talk detection using a differential power between a reference signal and a microphone signal. Since in a general acoustic system, however, an echo path gain is not known, difficulty is encountered in selecting a detection threshold.

A seventh conventional technique is disclosed in Patent Document 7. The seventh conventional technique conducts double-talk detection by comparing, with a threshold, a ratio between a cross-correlation of a microphone signal with a pseudo echo, and an auto-correlation of the pseudo echo. Since the microphone signal contains a background noise, the threshold should be selected as appropriate according to the nature of the background noise. Therefore, difficulty is encountered in selecting a detection threshold.

An eighth conventional technique is disclosed in Patent Document 8. The eighth conventional technique conducts double-talk detection using a cross-correlation about a variation in an analysis parameter for a reference signal and a microphone signal. Since the analysis parameter for a reference signal and a microphone signal should be found, there arises a problem that computational complexity is increased.

A ninth conventional technique is disclosed in Patent Document 9. The ninth conventional technique conducts double-talk detection using the frequency of saturation and the power of an error, and difficulty is encountered in selecting a threshold for saturation.

A tenth conventional technique is disclosed in Patent Document 10. The tenth conventional technique detects a double talk by comparing, with a threshold, a value of a power ratio between a reference signal and a microphone signal, plus a margin. Thus, detection performance is dependent upon the margin, which is difficult to determine.

Eleventh and twelfth conventional techniques are disclosed in Patent Documents 11 and 12, respectively. Both these conventional techniques employ two microphones, and are not applicable to a system comprising a single microphone.

A thirteenth conventional technique is disclosed in Patent Document 13. The thirteenth conventional technique detects a double talk by comparing, with a threshold, a value of a determinant defined using an auto-correlation of a microphone signal, an auto-correlation of a pseudo echo, and their cross-correlation. The value of the determinant, however, is variable depending upon an environment, resulting in difficulty in selecting the threshold.

An exemplary technique of double-talk detection using a normalized cross-correlation vector of a reference signal and a microphone signal is disclosed in Non-patent Document 4.

In Non-patent Document 4, double-talk detection is conducted using a normalized cross-correlation vector $c_{xm}$ of a reference signal x(k) and a microphone signal m(k) as follows:

[Equation 1]

$$c_{xm}(k) = (\sigma_m^2 R_{xx})^{-0.5} r_{xm}, \quad (7)$$

where $\sigma_m^2$ designates a variance of m(k), $r_{xm}=R_{xx}h$ designates a cross-correlation of x(k) and m(k), $R_{xx}=E[X(k)X^T(k)]$ designates an auto-correlation matrix of the reference signal x(k), E[•] designates an operator representing a mathematical expectation, and h designates an impulse response of an acoustic path from the speaker 2 to the microphone 3 given as follows:

$$h(k) = [h_0 h_1 \ldots h_{N-1}]^T \quad (8)$$

It should be noted that a near-end voice contained in a microphone signal is assumed to have no correlation with a reference signal, and a background noise is assumed to have no correlation with the reference signal.

A decision variable ξ for double-talk detection is given using $|c_{xm}|$ and paying attention to the fact that $\sigma_m^2$ is a scalar, as follows:

[Equation 2]

$$\xi = \sqrt{|c_{xm}|^2} = \sqrt{r_{xm}^T (\sigma_m^2 R_{xx})^{-1} r_{xm}} = \sqrt{\frac{r_{xm}^T R_{xx}^{-1} r_{xm}}{\sigma_m^2}} \quad (9)$$

A double-talk is decided when ξ is smaller than one.

Patent Document 1: Japanese Patent Application Laid Open No. H3-218150
Patent Document 2: Japanese Patent Application Laid Open No H6-13940
Patent Document 3: Japanese Patent Application Laid Open No. H6-14100
Patent Document 4: Japanese Patent Application Laid Open No H7-226793
Patent Document 5: Japanese Patent Application Laid Open No. H7-250397
Patent Document 6: Japanese Patent Application Laid Open No. H7-264103
Patent Document 7: Japanese Patent Application Laid Open No. H7-288493
Patent Document 8: Japanese Patent Application Laid Open No. H7-303070
Patent Document 9: Japanese Patent Application Laid Open No. H10-41858
Patent Document 10: Japanese Patent Application Laid Open No H11-215033
Patent Document 11: Japanese Patent Application Laid Open No. 2000-324233
Patent Document 12: Japanese Patent Application Laid Open No. 2004-40161

Patent Document 13: Japanese Patent Application Laid Open No. 2004-517579

Non-patent Document 1: *Adaptive Signal Processing*, 1985, Prentice-Hall Inc., U.S.A.

Non-patent Document 2: "Acoustic Echo Control," *IEEE Signal Processing Magazine*, pp. 42-69, July 1999.

Non-patent Document 3: *Adaptive Filters*, 1985, Kulwer Academic Publishers, U.S.A.

Non-patent Document 4: *IEEE Transactions on Speech and Audio Processing*, pp. 168-172, March 2000.

DISCLOSURE OF THE INVENTION

Problems to be Solved by the Invention

Calculation of ξ in EQ. (9) requires the cross-correlation and auto-correlation within the radical sign to be determined. Non-patent document 4 discloses a technique as a practical method for estimating correlations, in which the adaptive filter 5 is assumed to converge to make approximation:

[Equation 3]

$$R_{xx}^{-1} r_{xm} = h = W(k), \quad (10)$$

and moreover, the following calculation is made:

[Equation 4]

$$\hat{r}_{xm}(k) = \sum_{j=0}^{M-1} X(k-j)\hat{y}(k-j). \quad (11)$$

Since X(k) is a vector of N-th order from EQ (5), the calculation of EQ. (11) requires M multiplicative operations and MN additive operations for one sampling cycle. In Non-patent Document 4, it is assumed that M is 500 and N is 2048, which poses a problem that computational complexity required in double-talk detection is increased.

Another problem is a possibility that ξ in EQ. (9) does not reach a value of one even in a case of a single talk. This occurs because influence of a noise component n(k) contained in a microphone signal m(k) is not incorporated in EQ. (9). Specifically, while the denominator in EQ. (9) contains the noise component n(k), the numerator contains only information about a reference signal x(k) and h that is an impulse response of an acoustic path. Therefore, as n(k) increases, ξ decreases from one in a single talk. Whereas the denominator increases from the power of a near-end voice v(k), the numerator is not affected. Thus, in double-talk detection as in Non-patent Document 4, a single talk is erroneously detected as a double talk to result in a decrease in the frequency of coefficient update that should be required, thus impairing performance of removing echoes.

Moreover, since conventional double-talk detection controls coefficient update using either zero or one, influence of erroneous decision as zero or one is significant, and consequently possible performance degradation may occur.

The present invention has been made to address such problems, and its object is to provide a method and apparatus for removing echoes comprising double-talk detection capability with high accuracy of detection, low influence of erroneous detection, and low computational complexity.

Means for Solving the Problems

A first invention for solving the aforementioned problems is an echo removing method for providing a signal containing an echo, a near-end signal and a noise as an input signal, estimating an echo signal by filtering said input signal and a reference signal, subtracting said estimated echo signal from said input signal, and updating coefficients for said filtering by correlating a result of said subtraction and said reference signal, said method characterized in comprising: estimating a noise contained in said mixed signal to determine an estimated noise; estimating a near-end signal contained in said mixed signal using said estimated noise; and controlling said coefficient update according to said estimated near-end signal.

A second invention for solving the aforementioned problems is an echo removing method for processing a reference signal with an adaptive filter to calculate an output, subtracting said output of said adaptive filter from a mixed signal containing at least an echo, a near-end signal and a noise, and adaptively updating said coefficients by correlating a result of said subtraction and said reference signal, said method characterized in comprising: estimating a noise contained in said mixed signal to determine an estimated noise; detecting a near-end signal contained in said mixed signal using said estimated noise; defining two discrete values according to the presence of said near-end signal; and adaptively controlling the degree of said coefficient update according to said two discrete values.

A third invention for solving the aforementioned problems is an echo removing method for processing a reference signal with an adaptive filter to calculate an output, subtracting said output of said adaptive filter from a mixed signal containing at least an echo, a near-end signal and a noise, and adaptively updating said coefficients by correlating a result of said subtraction and said reference signal, said method characterized in comprising: estimating a noise contained in said mixed signal to determine an estimated noise; detecting a near-end signal contained in said mixed signal using said estimated noise to determine a continuous value corresponding to reliability in the detection; and adaptively controlling the degree of said coefficient update according to said continuous value.

A fourth invention for solving the aforementioned problems is a noise removing method for processing a reference signal with an adaptive filter to calculate an output, subtracting said output of said adaptive filter from a mixed signal containing at least an interfering signal, a target signal and a noise, and adaptively updating said coefficients by correlating a result of said subtraction and said reference signal, said method characterized in comprising: estimating a noise contained in said mixed signal to determine an estimated noise; detecting a target signal contained in said mixed signal using said estimated noise to determine a value corresponding to reliability in the detection; and adaptively controlling the degree of said coefficient update according to said value corresponding to the reliability.

A fifth invention for solving the aforementioned problems is a signal processing method operating to generate a target blocked signal in which a target signal is suppressed by processing a mixed signal with a first set of adaptive filters, said mixed signal being received by a plurality of microphones and containing at least an interfering signal, a target signal and a noise, generate a pseudo interfering signal by processing said target blocked signal with a second set of adaptive filters, generate a target enhanced signal in which the target signal is enhanced by processing said mixed signal with a set of fixed filters, and remove the interfering signal by subtracting said pseudo interfering signal from said target enhanced signal, said method characterized in comprising: estimating a noise contained in said mixed signal to determine an estimated noise; detecting a target signal contained in said mixed signal using said estimated noise to determine a value corresponding to reliability in the detection; and adaptively controlling the degree of coefficient update for said first and second sets of adaptive filters according to said value corresponding to the reliability.

A sixth invention for solving the aforementioned problems is an echo removing device comprising at least an adaptive filter for processing a reference signal to calculate an output, a subtractor for subtracting said output of said adaptive filter from a mixed signal containing at least an echo, a near-end signal and a noise, and a coefficient updating circuit for calculating an amount of coefficient update by correlating an output of said subtractor and said reference signal, said device characterized in further comprising: a noise estimating circuit for estimating a noise contained in said mixed signal to determine an estimated noise; a double-talk detecting circuit for determining information about the presence of a near-end signal contained in said mixed signal using said estimated noise; and a switch for selectively transmitting an output of said coefficient updating circuit to said adaptive filter in response to an output of said double-talk detecting circuit.

A seventh invention for solving the aforementioned problems is a noise removing device configured to comprise at least an adaptive filter for processing a reference signal to calculate an output, a subtractor for subtracting said output of said adaptive filter from a mixed signal containing at least an interfering signal, a target signal and a noise, and a coefficient updating circuit for calculating an amount of coefficient update by correlating an output of said subtractor and said reference signal, said device characterized in further comprising: a noise estimating circuit for estimating a noise contained in said mixed signal to determine an estimated noise; a double-talk detecting circuit for determining information about the presence of a target signal contained in said mixed signal using said estimated noise; and a multiplier for transmitting an output of said coefficient updating circuit to said adaptive filter after correcting said output in response to an output of said double-talk detecting circuit.

An eighth invention for solving the aforementioned problems is a signal processing device comprising at least a plurality of microphones, a first set of adaptive filters for generating a target blocked signal in which a target signal is suppressed by processing a mixed signal, said mixed signal being received by said plurality of microphones and containing at least an interfering signal, a target signal and a noise, a second set of adaptive filters for generating a pseudo interfering signal by processing said target blocked signal, a set of fixed filters for generating a target enhanced signal in which the target signal is enhanced by processing said mixed signal, and a subtractor for subtracting said pseudo interfering signal from said target enhanced signal, said device characterized in further comprising at least: a noise estimating circuit for estimating a noise contained in said mixed signal to determine an estimated noise; a double-talk detecting circuit for determining information about the presence of a target signal contained in said mixed signal using said estimated noise; and a multiplier for transmitting an output of said coefficient updating circuit to said adaptive filter after correcting said output in response to an output of said double-talk detecting circuit, wherein the coefficient update for said first and second sets of adaptive filters is adaptively controlled corresponding to the output of said double-talk detecting circuit.

A ninth invention for solving the aforementioned problems is a double-talk detecting method characterized in comprising: estimating a noise contained in a mixed signal containing at least an echo, a near-end signal and a noise to determine an estimated noise; and detecting the presence of a near-end signal contained in said mixed signal using said estimated noise.

A tenth invention for solving the aforementioned problems is a double-talk detecting device characterized in comprising: a noise estimating circuit for estimating a noise contained in a mixed signal containing at least an echo, a near-end signal and a noise to determine an estimated noise; and a double-talk detecting circuit for determining information about the presence of a near-end signal contained in said mixed signal using said estimated noise.

An eleventh invention for solving the aforementioned problems is a program for causing a computer to execute: adaptive filtering processing of processing a reference signal to calculate an output; processing of subtracting said output of said adaptive filter from a mixed signal containing at least an echo, a near-end signal and a noise; coefficient updating processing of calculating an amount of coefficient update by correlating a result of said processing of subtracting and said reference signal; noise estimating processing of estimating a noise contained in said mixed signal to determine an estimated noise; double-talk detecting processing of determining information about the presence of a near-end signal contained in said mixed signal using said estimated noise; and multiplying processing of transmitting a result of said coefficient updating processing to said adaptive filter after correcting said result in response to a result of said double-talk detecting processing.

A twelfth invention for solving the aforementioned problems is a program for causing a computer to execute: adaptive filtering processing of processing a reference signal to calculate an output; processing of subtracting said output of said adaptive filter from a mixed signal containing at least an interfering signal, a target signal and a noise; coefficient updating processing of calculating an amount of coefficient update by correlating a result of said processing of subtracting and said reference signal; noise estimating processing of estimating a noise contained in said mixed signal to determine an estimated noise; double-talk detecting processing of determining information about the presence of a near-end signal contained in said mixed signal using said estimated noise; and multiplying processing of transmitting a result of said coefficient updating processing to said adaptive filter after correcting said result in response to a result of said double-talk detecting processing.

A thirteenth invention for solving the aforementioned problems is a program for causing a computer to execute: first adaptive filtering processing of generating a target blocked signal in which a target signal is suppressed by processing a mixed signal, said mixed signal being received by a plurality of microphones and containing at least an interfering signal, a target signal and a noise; second adaptive filtering processing of generating a pseudo interfering signal by processing said target blocked signal; fixed filtering processing of generating a target enhanced signal in which the target signal is enhanced by processing said mixed signal; subtracting processing of subtracting said pseudo interfering signal from said target enhanced signal; noise estimating processing of estimating a noise contained in said mixed signal to determine an estimated noise; double-talk detecting processing of determining information about the presence of a target signal contained in said mixed signal using said estimated noise; multiplying processing of transmitting a result of said coefficient updating processing to said adaptive filter after correcting said result in response to a result of said double-talk detecting processing; and processing of adaptively controlling the coefficient update for said first and second adaptive filtering processing corresponding to the result of said double-talk detecting processing.

The echo removing method and device of the present invention comprise noise estimating means, and detect a double talk using an estimated noise, a microphone signal and a pseudo echo. By correcting information obtained from the pseudo echo and microphone signal with an estimated noise to detect a double talk, the objects of the present invention are attained. Moreover, the echo removing method and device of the present invention detect a double talk using a reliability coefficient as expressed by a continuous value between zero and one. By using a continuous value instead of a binary value of zero or one, influence of erroneous detection is reduced.

Effects of the Invention

A first effect is that high performance of removing echoes is attained. This is because accurate control of coefficient update can be achieved by estimating a noise getting into a microphone signal, and detecting a double talk using information corrected with the estimated noise.

A second effect is that computational complexity is reduced. This is because complex matrix or vector calculation is not used in double-talk detection.

A third effect is that influence of erroneous detection is reduced. This is because a reliability coefficient as expressed by a continuous value between zero and one is used in double-talk detection.

EXPLANATION OF SYMBOLS

Figure 1:
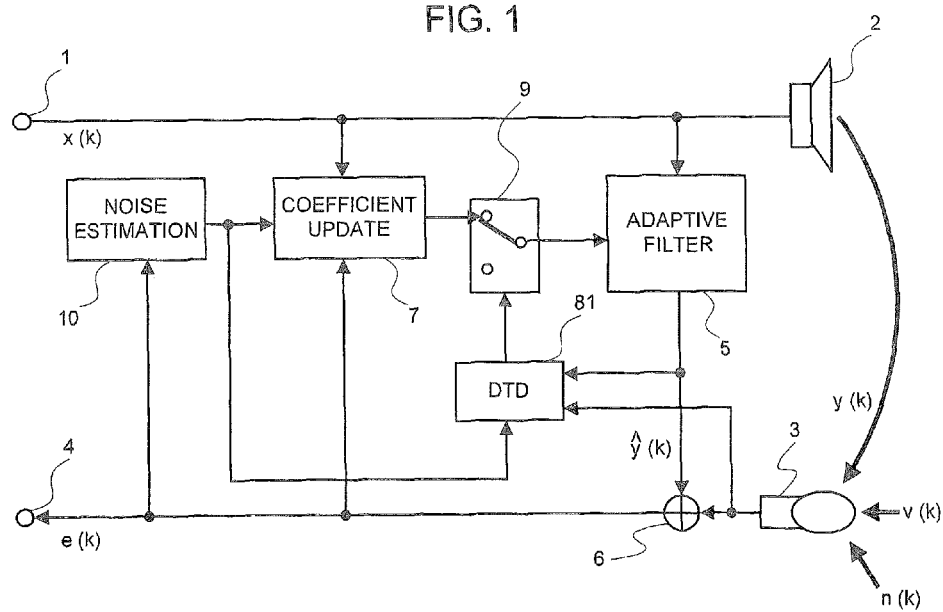
FIG. 1 A block diagram showing the best mode of the present invention and the configuration of embodiments 1 and 2.

1 Input terminal
2 Speaker
3, 31, $3_0$, $3_1$, $3_2$, $3_3$, . . . , $3_{M-1}$ Microphones
4 Output terminal
5 Adaptive filter
6 Subtractor
7 Coefficient updating circuit
8, 81, 82, 821 Double-talk detecting circuit
9, 822 Switch
10, 11 Noise estimating circuit
12 Fixed beamformer
13 Blocking matrix
14 Multi-input canceller
91 Multiplier
823 Coefficient variation evaluating circuit
824 Information combining circuit

BEST MODES FOR CARRYING OUT THE INVENTION

Now the best modes for carrying out the invention will be described in detail with reference to the accompanying drawings.

Figure 12:
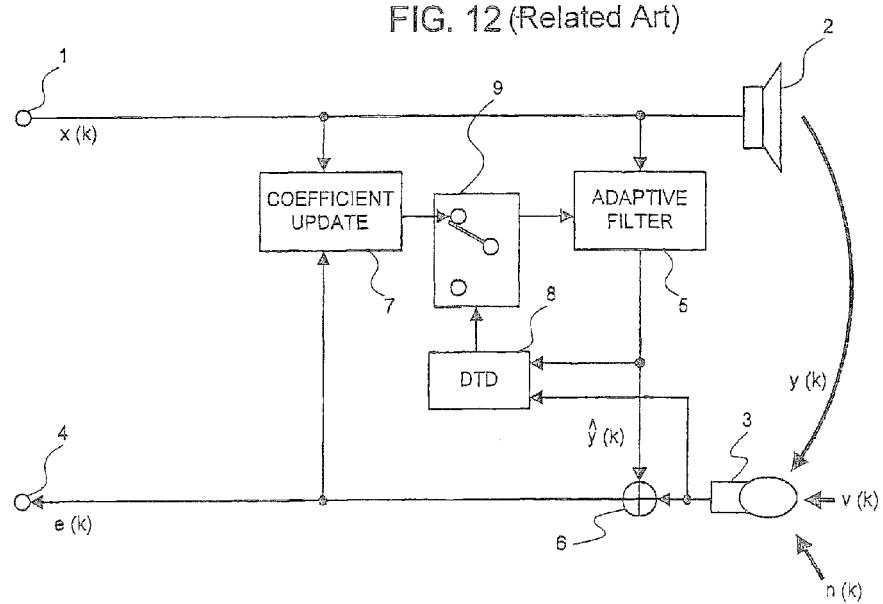
FIG. 12 A block diagram showing the configuration of a conventional technique.

Referring to FIG. 1, a first embodiment of the present invention includes an adaptive filter 5, a subtractor 6, a noise estimating circuit 10, a coefficient updating circuit 7, a switch 9, and a double-talk detecting circuit 81. The operation of the adaptive filter 5, subtractor 6, noise estimating circuit 10, coefficient updating circuit 7 and switch 9 has been described as the conventional technique with reference to FIG. 12. The noise estimating circuit 10 estimates a noise on receipt of an error. The double-talk detecting circuit 81 detects a double talk on receipt of a pseudo echo, a microphone signal, and an estimated noise.

Embodiment 1

The double-talk detecting circuit 81 is supplied with a microphone signal m(k) and a pseudo echo y(k) hat. A procedure to detect a double talk using these signals will be given below:

Applying $r_{xm}=R_{xx}h$ to EQ. (9) gives EQ. (12)

[Equation 5]

$$\xi = \sqrt{\frac{h^T R_{xx} h}{\sigma_m^2}}. \tag{12}$$

Using an approximation of EQ. (10), i.e., h=W(k), and paying attention to the fact that $E[h^T X(k)]=E[y(k)$ hat$]$, the following equation is obtained:

[Equation 6]

$$\xi(k) = \sqrt{\frac{E[\hat{y}(k)^2]}{\sigma_m^2}}. \tag{13}$$

In this equation, $\xi$ is time-varying and therefore it is given as a function of k. The calculation of EQ. (13) consists of one multiplicative operation for a numerator in the radical sign, and one multiplicative operation for a denominator therein. In practice, $\sigma_m^2$ is the average power of the microphone signal m(k), and is determined as:

[Equation 7]

$$\sigma_m^2(k) = \sum_{j=0}^{M-1} m^2(k-j). \tag{14}$$

Since EQ. (14) is a moving average of $m^2(k)$, it can be calculated for a past value by an additive operation of $m^2(k)$ and a subtractive operation of $m^2(k-M)$ in practice. That is, two additive operations are required.

Similarly, $E[y(k)^2\,\text{hat}]$ is determined as:

[Equation 8]

$$E[\hat{y}(k)^2] = \sum_{j=0}^{M-1} \hat{y}^2(k-j). \quad (15)$$

Thus, it requires two additive operations similarly to EQ. (14). As described above, calculation of $\xi(k)$ of EQ. (13) requires two multiplicative operations and four additive operations, and in addition to that, an operation of extraction of square root. Thus, similar performance can be achieved with reduced computational complexity as compared with the scheme disclosed in Non-patent Document 4.

The microphone signal $m(k)$ for use in the calculation of EQ. (14) can be written as:

$$m(k)=y(k)+v(k)+n(k). \quad (16)$$

If there is no correlation among $y(k)$, $v(k)$ and $n(k)$, the following equation holds:

$$E[m^2(k)]=E[y^2(k)]+E[v^2(k)]+E[n^2(k)]. \quad (17)$$

Rewriting it using $E[m^2(k)]=\sigma_m^2(k)$, $E[y^2(k)]=\sigma_y^2(k)$, $E[v^2(k)]=\sigma_v^2(k)$, and $E[n^2(k)]=\sigma_n^2(k)$ gives:

$$\sigma_m^2(k)=\sigma_y^2(k)+\sigma_v^2(k)+\sigma_n^2(k). \quad (18)$$

Since $v(k)=0$ in a single talk, $$\sigma_m^2(k)=\sigma_y^2(k)+\sigma_n^2(k). \quad (19)$$

In other words, the denominator of EQ. (13) is affected by $E[n^2(k)]=\sigma_n^2(k)$. On the other hand, the numerator of EQ. (13) contains no information about $n(k)$. Therefore, albeit $\xi(k)$ should be one in a single-talk, it will have a small value farther away from one for a larger power of noise.

According to the present invention, influence of noise is prevented by estimating a noise and correcting EQ. (13) with the noise value; Representing an estimated noise as $n(k)$ hat, $\xi(k)$ after being corrected with the estimated noise is given by EQ. (20) as follows:

[Equation 9]

$$\xi(k) = \sqrt{\frac{E[\hat{n}^2(k)] + E[\hat{y}^2(k)]}{\sigma_m^2(k)}}. \quad (20)$$

According to the present invention, $\xi(k)$ of EQ. (20) is calculated using the double-talk detecting circuit 81. A power of the estimated noise $n^2(k)$ hat is supplied from the noise estimating circuit 10.

The noise estimating circuit 10 is supplied with an error signal $e(k)$. The noise estimating circuit 10 calculates a power of the estimated noise $n^2(k)$ hat according to:

$$n^2(k)\text{hat}=\text{Ave}[e^2(k)], \quad (21)$$

where $\text{Ave}[\cdot]$ is an operator for calculating an average. The calculation of an average can be achieved using the moving average as given by EQ. (14) or (15), or a linear leaky integration represented by:

$$n^2(k+1)\text{hat}=\delta_n \cdot n^2(k)\text{hat}+(1-\delta_n)\cdot e^2(k), \quad (22)$$

where $\delta_n$ is a time constant for averaging.

Since $$e(k)=y(k)-y(k)\text{hat}+v(k)+n(k), \quad (23)$$

EQ. (21) is calculated to update $n^2(k)$ hat only when $v(k)=0$ and a residual echo is substantially small.

To evaluate $v(k)=0$, a normalized instant auto-correlation, which is obtained by normalizing an instant auto-correlation of $e(k)$ with an average thereof, can be used. Representing an average of instant correlations with adjacent samples as $\rho_0(k)$, it can be calculated according to the following equation:

$$\rho_0(k+1)=\delta_a\rho_0(k)+(1-\delta_a)\cdot e(k)e(k-1), \quad (24)$$

where $\delta_a$ is a time constant for averaging. The normalized instant auto-correlation given by $\rho(k)/\rho_0(k)$ is compared with a threshold $\gamma$, and EQ. (21) is calculated only when the former value is smaller; otherwise, the value is kept. This corresponds to a case in which the auto-correlation of $e(k)$ is small. Since the auto-correlation of $e(k)$ is large when a near-end voice $v(k)$ is contained in $e(k)$ or a residual echo is large, EQ. (20) can be calculated to update $n^2(k)$ hat only when $v(k)=0$ and a residual echo is substantially small.

In the linear leaky integration presented in EQ. (22), selection of the time constant for averaging $\delta_n$ is important. Larger $\delta_n$ results in poorer performance of an estimated noise in tracking a noise but provides estimation with higher accuracy, while smaller $\delta_n$ results in better tracking performance but deteriorates accuracy in estimation. To address such a trade-off, it is possible to adaptively control $\delta_n$. In general, relatively large $\delta_n$ is used in the beginning of noise estimation, and the value of $\delta_n$ is decremented as the estimated noise comes closer to the actual noise (or the average thereof).

Adaptive control of $\delta_n$ can be achieved using information about a gradient of an estimated noise with respect to a time. As the estimated noise comes closer to the average of a true noise, the gradient becomes smaller. In other words, by using a larger value of $\delta_n$ for a larger gradient and a smaller value of $\delta_n$ for a smaller gradient, the value of $\delta_n$ can be appropriately controlled. The gradient may be approximated by a variation of the estimated noise (a difference from an adjacent sample).

To control the value of $\delta_n$ using the gradient, the sign of the gradient can be used. When the estimated noise comes substantially close to the average of the true noise, the gradient has positive and negative values with generally equal probability. Therefore, the sign of the gradient is observed over a certain period of time, and the value of $\delta_n$ can be controlled according to a bias of the sign. An exemplary method involves comparing two consecutive signs of the gradient, and incrementing the value of $\delta_n$ if the signs are the same; otherwise, decrementing the value. Alternatively, probabilities of occurrence for positive and negative signs, instead of two consecutive signs, may be compared over a certain time of period for use as an index for controlling the value of $\delta_n$.

On the assumption that a pseudo echo $y(k)$ hat substantially approximates to an echo $y(k)$ and an estimated noise $n(k)$ hat substantially approximates to a noise $n(k)$, EQ. (17) is applied to the denominator of EQ. (20) to give:

[Equation 10]

$$\xi(k) = \begin{cases} 1 & v(k)=0 \\ \sqrt{\dfrac{E[\hat{n}^2(k)] + E[\hat{y}(k)]}{E[n^2(k)] + E[y^2(k)] + E[v^2(k)]}} & v(k) \neq 0. \end{cases} \quad (25)$$

If the echo $E[y^2(k)]$ is substantially larger than the noise $E[n^2(k)]$, and $E[y^2(k)]$ and $E[n^2(k)]$ can be approximated by $E[y^2(k)]$ hat and $E[n^2(k)]$ hat, respectively, EQ. (25) gives EQ. (26) as follows:

[Equation 11]

$$\xi(k) = \begin{cases} 1 & v(k) = 0 \\ \sqrt{\dfrac{1}{1 + E[v^2(k)]/E[\hat{y}^2(k)]}} & v(k) \neq 0. \end{cases} \quad (26)$$

In other words, $\xi(k)$ is one in a single talk, and has a value smaller than one that is determined by a ratio between an echo and a near-end voice in a double talk. Accordingly, a double talk is decided and coefficient update is forgone by opening the switch 9 when $\xi(k)$ has a value other than one.

Embodiment 2

In an embodiment 2, a time-varying threshold is applied to $\xi(k)$. From EQ. (26), the value of $\xi(k)$ in a double talk is approximately dependent upon a ratio between the power of a near-end signal and the power of an echo. Thus, if the power of a near-end signal and the power of an echo can be estimated, the value of $\xi(k)$ in a double talk can be determined. The power of an echo can be sequentially determined by approximating it with the power of a pseudo echo. The power of a near-end signal can be calculated similarly to EQ. (21) as:

$$v^2(k)\text{hat} = \text{Ave}[e^2(k)]. \quad (27)$$

The calculation of Ave[•] can be achieved using the moving average as given by EQ. (14) or (15), or a linear leaky integration represented by:

$$v^2(k+1)\text{hat} = \delta_v \cdot v^2(k)\text{hat} + (1-\delta_v) \cdot e^2(k), \quad (28)$$

where $\delta_v$ is a time constant for averaging. For $\delta_v$, adaptive control similar to that for $\delta_n$ may be used.

As can be clearly seen from EQ. (23), EQ. (28) is calculated to update $v^2(k)$ hat only when the residual echo and noise are substantially small. Using the power of a near-end signal and the power of a pseudo echo thus obtained can be used to determine the value of $\xi(k)$ corresponding to a double talk, $\xi_{DT}(k)$.

Once $\xi_{DT}(k)$ has been determined, a threshold $\xi_{TH}(k)$ that fulfills $\xi_{DT}(k) < \xi_{TH}(k) < 1$ is determined to decide $\xi(k)$ greater than the threshold as a single talk and that smaller than the threshold as a double talk. In this double-talk decision, $\xi_{DT}(k)$ bar obtained by applying a linear leaky integration to $\xi_{DT}(k)$ and averaging it may be employed in place of $\xi_{DT}(k)$.

Embodiment 3

Figure 2:
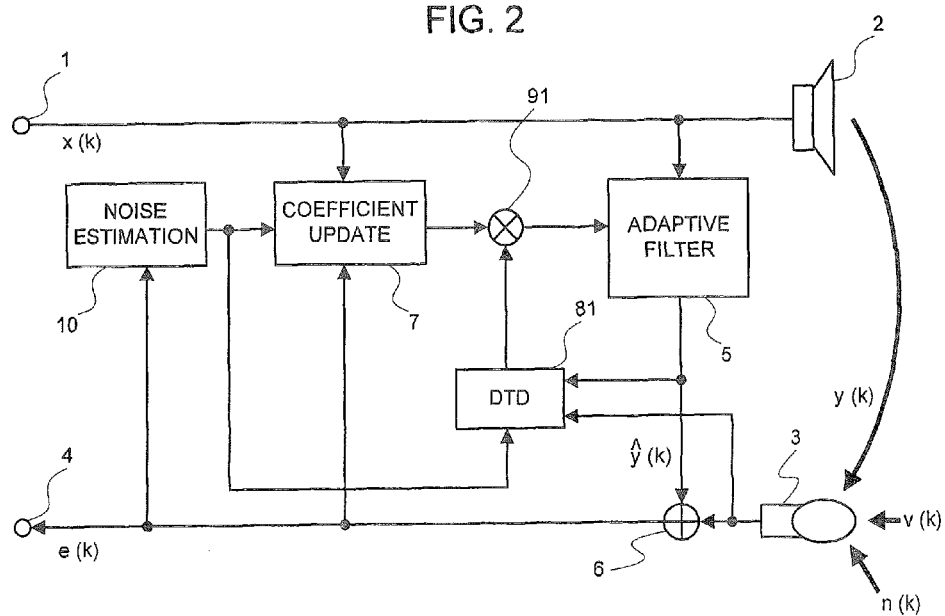
FIG. 2 A block diagram showing an embodiment 3 of the present invention.

An embodiment 3 shown in FIG. 2 comprises a multiplier 91 in place of the switch 9. The double-talk detecting circuit 81 supplies to the multiplier 91 a reliability coefficient for a double talk expressed by a continuous value between zero and one. The multiplier 91 multiplies the amount of coefficient update supplied from the coefficient updating circuit 7 by the reliability coefficient, and then transmits a result to the adaptive filter 5. Thus, coefficient update is made by the amount corresponding to the reliability coefficient for a double talk. This means that coefficient update is completely suspended if a double talk is confidently decided, and is made by an amount corresponding to the reliability if a double talk is uncertain. Thus, performance of removing echoes is improved as compared with either-or control in which coefficient update is to be made or not.

Representing a reliability coefficient as $\theta(k)$, it can be determined by:

$$\theta(k) = \{\xi(k) - \xi_{DT}(k)\}/\{1 - \xi_{DT}(k)\}. \quad (29)$$

Although in EQ. (29), $\theta(k)$ is a linear function of $\xi(k)$, it may be a non-linear function of $\xi(k)$. Moreover, whether it for a linear function or non-linear function, $\xi_{DT}(k)$ bar may be employed in place of $\xi_{DT}(k)$, as explained above. Furthermore, although in the preceding description, setting is made such that 1 and $\xi_{DT}(k)$ correspond to one and zero, it is possible to make a range narrower than that between 1 and $\xi_{DT}(k)$ correspond to one and zero, and clip a range beyond that into zero and one.

It should be noted that obviously, double-talk control based on a reliability coefficient using the multiplier 91 is applicable to the aforementioned embodiments 1 and 2 as well.

Embodiment 4

Figure 3:
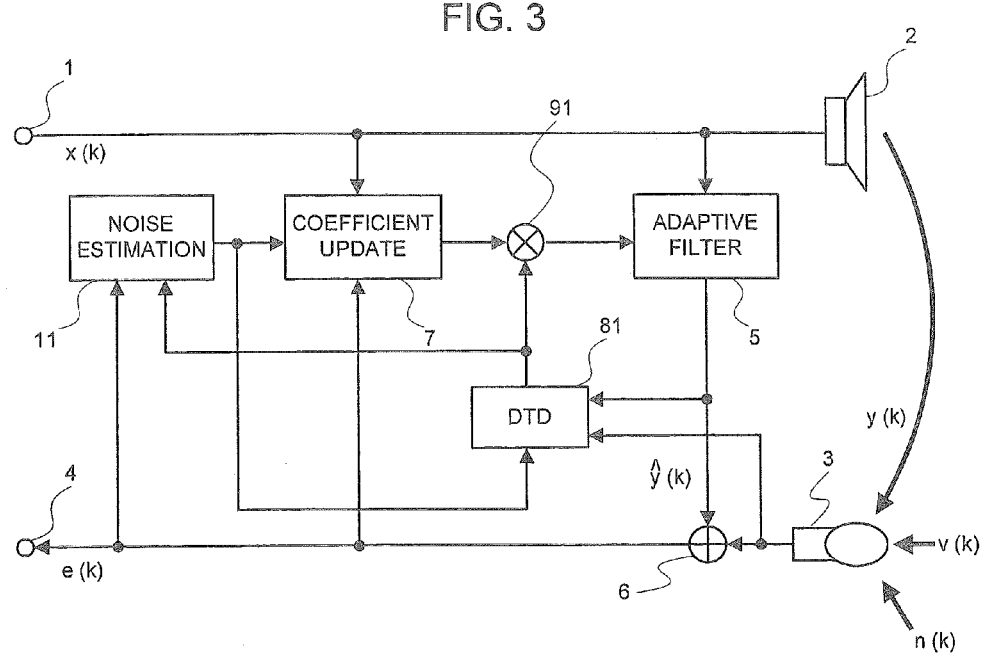
FIG. 3 A block diagram showing an embodiment 4 of the present invention.

An embodiment 4 shown in FIG. 3 comprises a noise estimating circuit 11 in place of the noise estimating circuit 10. The noise estimating circuit 11 is supplied with double-talk detection information in addition to an error signal e(k). The noise estimating circuit 11 can use, in addition to evaluation of the presence of v(k) using the error signal e(k), double-talk information, which is zero or one supplied from the double-talk detecting circuit 81, or a reliability coefficient $\theta(k)$, which is expressed by a continuous value between zero and one, as information about the presence of v(k). In other words, this operation is detection of the presence of a near-end signal using the normalized instant auto-correlation, and double-talk information or reliability coefficient in combination.

For example, even when the normalized instant auto-correlation is smaller than a threshold $\gamma$, a near-end signal is decided to be present if the double-talk information is one or the reliability coefficient is larger than a predetermined threshold. Alternatively, when the reliability coefficient falls within a certain range beyond one and zero, interrelationship between the normalized instant auto-correlation and threshold may be referred to. Moreover, it is possible to evaluate the presence of a near-end signal using only the double-talk information or reliability coefficient, without using any information about the normalized instant auto-correlation.

Embodiment 5

Figure 4:
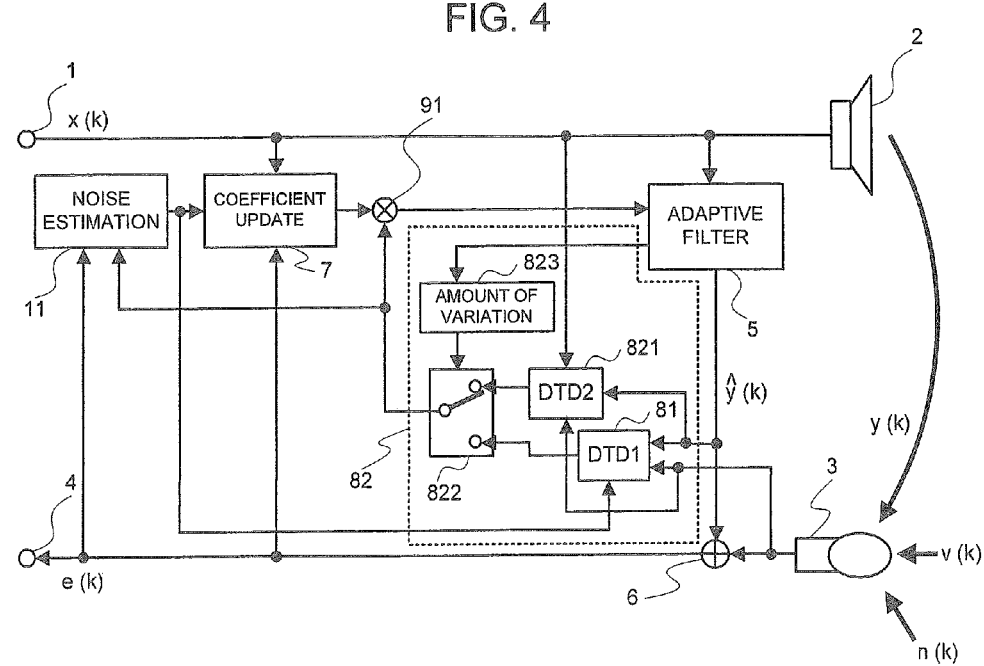
FIG. 4 A block diagram showing an embodiment 5 of the present invention.

An embodiment 5 shown in FIG. 4 comprises a double-talk detecting circuit 82 in place of the double-talk detecting circuit 81 in FIG. 3. The double-talk detecting circuit 82 has therein the double-talk detecting circuit 81 as described above and a new double-talk detecting circuit 821, and one of outputs from them is selected by a switch 822 for outputting. The operation of the switch 822 is controlled by an output from a coefficient variation evaluating circuit 823. The coefficient variation evaluating circuit 823 receives coefficient values from the adaptive filter 5 and evaluates their variation.

The double-talk detecting circuit 821 is supplied with a reference signal x(k), a pseudo echo y(k) hat, and a microphone signal m(k), and it detects a double talk by comparing, with a reference signal x(k), $m(k) \cdot R_{xy}(k)$ calculated using a ratio $R_{xy}(k)$ between the reference signal and echo. In a single talk, $m(k) \cdot R_{xy}(k)$ is nearly equal to the reference signal because m(k) is nearly equal to the echo y(k). In a double talk, $m(k) \cdot R_{xy}(k)$ has a value larger than that in a single talk because m(k) contains v(k). That is, m(k)·$R_{xy}$(k) is larger than the reference signal. By using such inequality to evaluate m(k)·$R_{xy}$(k), a double talk can be detected. Comparison of m(k)·$R_{xy}$(k) with the reference signal x(k) may be carried out using their maximum or average values for a plurality of consecutive samples, or a maximum or average value and an instant value.

The ratio $R_{xy}$(k) between a reference signal and an echo can be approximately calculated as a ratio between the reference signal x(k) and pseudo echo y(k) hat. To obtain a stable value of $R_{xy}$(k) with high accuracy, the reference signal x(k) and pseudo echo y(k) hat may be subjected a linear leaky integration or moving average to obtain an averaged value for use. Moreover, the reference signal x(k) may be compared with β·m(k)·$R_{xy}$(k) in order to provide an appropriate margin in double-talk detection, where β denotes a constant near one.

Since initial values of the coefficients for the adaptive filter 5 are generally zero, the initial value of the pseudo echo y(k) hat is zero as well, possibly introducing infinity for the initial value of $R_{xy}$(k). To prevent this, the pseudo echo y(k) hat is given a certain initial value. Since the gain for a two-wire-to-four-wire converter circuit is generally smaller than −6 dB, a suitable initial value for $R_{xy}$(k) may be −6 dB. In a case of an echo due to acoustic coupling, $R_{xy}$(k) may be greater than 0 dB because of a positive gain that may possibly be present in the path from the microphone to the subtractor 6. Accordingly, an initial value of 0 dB is set for example.

The coefficient variation evaluating circuit 823 uses coefficient values W(k) received from the adaptive filter 5 to evaluate a variation of W(k). One method to evaluate a variation is to determine a square sum $S_W(k)$ of elements of the coefficient values W(k) according to EQ. (30) below for evaluation:

[Equation 12]

$$S_W(k) = \sum_{j=0}^{N-1} w_j^2(k). \tag{30}$$

Since coefficient update for the coefficient values W(k) is started with a zero vector as an initial value, $S_W(k)$ starts at zero and gradually increases. Once the coefficient has been almost convergent, $S_W(k)$ stops increasing and saturates. By using such a property to evaluate an increment of $S_W(k)$, $\{S_W(k)-S_W(k-1)\}$, convergence of the adaptive filter can be detected.

The aforementioned evaluation of an increment may be achieved using the sign of $\{S_W(k)-S_W(k-1)\}$. Specifically, while the sign does not change and the same sign continues to appear, the converging process is decided to be in progress; when the sign begins to alternate, convergence is decided to be reached. Such a variation of the sign may be evaluated on a sample-by-sample basis, or a plurality of samples may be evaluated together. When evaluating a plurality of samples together, a total sum of the signs of the plurality of samples may be evaluated, or majority of the signs may be evaluated.

Moreover, the aforementioned evaluation of an increment may be achieved using an absolute value or square value of $\{S_W(k)-S_W(k-1)\}$. Specifically, while the absolute value or square value is large, the converging process is decided to be in progress; when the value has come close proximity to zero, convergence is decided to be reached. For this purpose, the absolute or square value is compared with a threshold. Such an absolute or square value may be evaluated on a sample-by-sample basis, or a plurality of samples may be evaluated together. When evaluating a plurality of samples together, a total sum of absolute or square values over a plurality of samples may be evaluated, or an average thereof may be evaluated.

Furthermore, the aforementioned evaluation of an increment may be achieved using a normalized absolute value or a normalized square value obtained by normalizing the absolute value or square value of $\{S_W(k)-S_W(k-1)\}$ with $S_W(k)$. Specifically, while the normalized absolute value or normalized square value is large, the converging process is decided to be in progress; when the value has come close proximity to zero, convergence is decided to be reached. For this purpose, the normalized absolute or square value is compared with a threshold. Such a normalized absolute or square value may be evaluated on a sample-by-sample basis, or a plurality of samples may be evaluated together. When evaluating a plurality of samples together, a total sum of normalized absolute or square values over a plurality of samples may be evaluated, or an average thereof may be evaluated.

While in the preceding description, $S_W(k)$ is defined as a square sum of elements of the coefficient values W(k), another index exhibiting a similar property may be used. Examples of such an index include: a total sum of absolute values of elements of the coefficient values W(k), and a square sum or a sum of absolute values of part of elements of the coefficient values W(k). In particular, by selecting part of elements having large absolute values, a similar property to that in the total sum can be obtained while reducing computational complexity.

The operation as described above enables the coefficient variation evaluating circuit 823 to evaluate the status of convergence of the adaptive filter 5. The coefficient variation evaluating circuit 823 makes control such that the switch 822 selectively outputs an output of the double-talk detecting circuit 821 until the adaptive filter 5 reaches convergence, and an output of the double-talk detecting circuit 81 after convergence is reached. In practice, the coefficient variation evaluating circuit 823 evaluates a general amount of coefficient update, in addition to convergence of the adaptive filter 5. For this reason, the coefficient variation evaluating circuit 823 makes control such that the switch 822 selectively outputs an output of the double-talk detecting circuit 821 while the amount of coefficient update for the adaptive filter 5 is large, and an output of the double-talk detecting circuit 81 while the amount is small.

Such a configuration improves accuracy of double-talk detection. This is because the double-talk detecting circuit 81 employs a pseudo echo y(k) hat as an approximation of an echo y(k). When the amount of coefficient variation (i.e., the amount to be corrected) is large when, for example, the adaptive filter 5 is in the converging process, the pseudo echo y(k) hat does not approximate the echo y(k) with sufficient accuracy. For this reason, a detection result by the other double-talk detecting circuit 821, which does not employ the pseudo echo y(k) hat as an approximation of the echo y(k), is used to improve detection accuracy.

As a special example of such control, the switch 822 may be configured to selectively supply an output of the double-talk detecting circuit 821 until the adaptive filter 5 reaches convergence, and an output of the double-talk detecting circuit 81 after convergence, to the multiplier 91 and noise estimating circuit 11.

Embodiment 6

Figure 5:
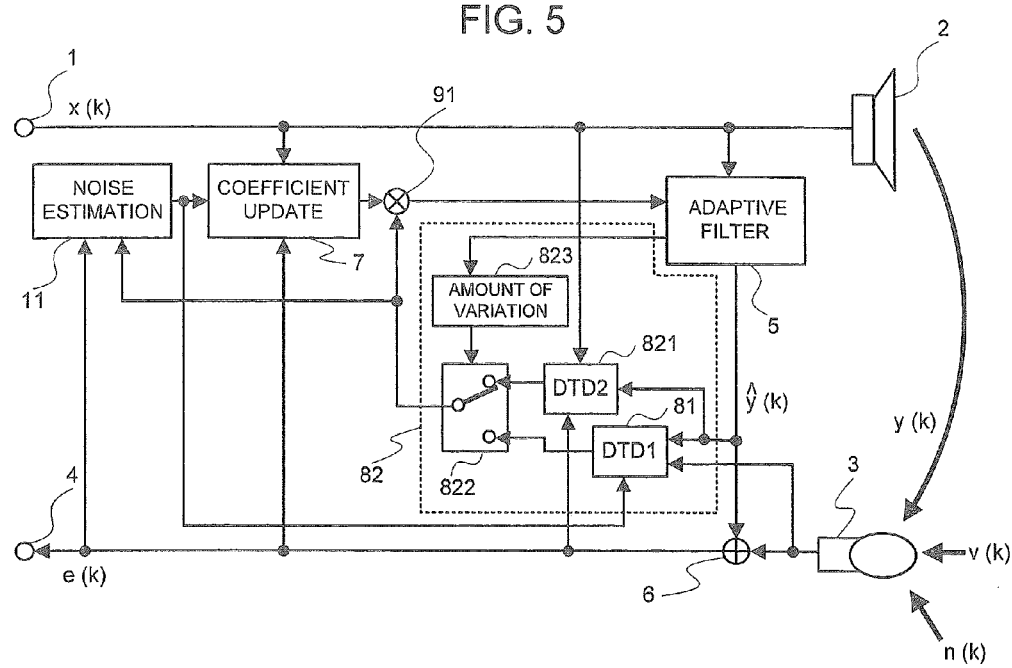
FIG. 5 A block diagram showing an embodiment 6 of the present invention.

In an embodiment 6 shown in FIG. 5, the input to the double-talk detecting circuit 821 of FIG. 4 is an echo-free signal e(k), rather than a microphone signal m(k). The double-talk detecting circuit 821 operates similarly to the embodiment 5. A double talk is detected by comparing, with a reference signal x(k), e(k)·$R_{xy}$(k) calculated using a ratio $R_{xy}$(k) between the reference signal and echo. In a single talk, e(k) has a value between an echo y(k) and zero according to the degree of convergence of the adaptive filter 5. Accordingly, e(k)·$R_{xy}$(k) is decreased from a value nearly equal to the reference signal to a smaller value corresponding to convergence of the adaptive filter 5, and becomes about zero after convergence. In a double talk, it has a value larger than that in a single talk because e(k) contains v(k). That is, e(k)·$R_{xy}$(k) is larger than the reference signal. By using such inequality to evaluate e(k)·$R_{xy}$(k), a double talk can be detected.

Embodiment 7

Figure 6:
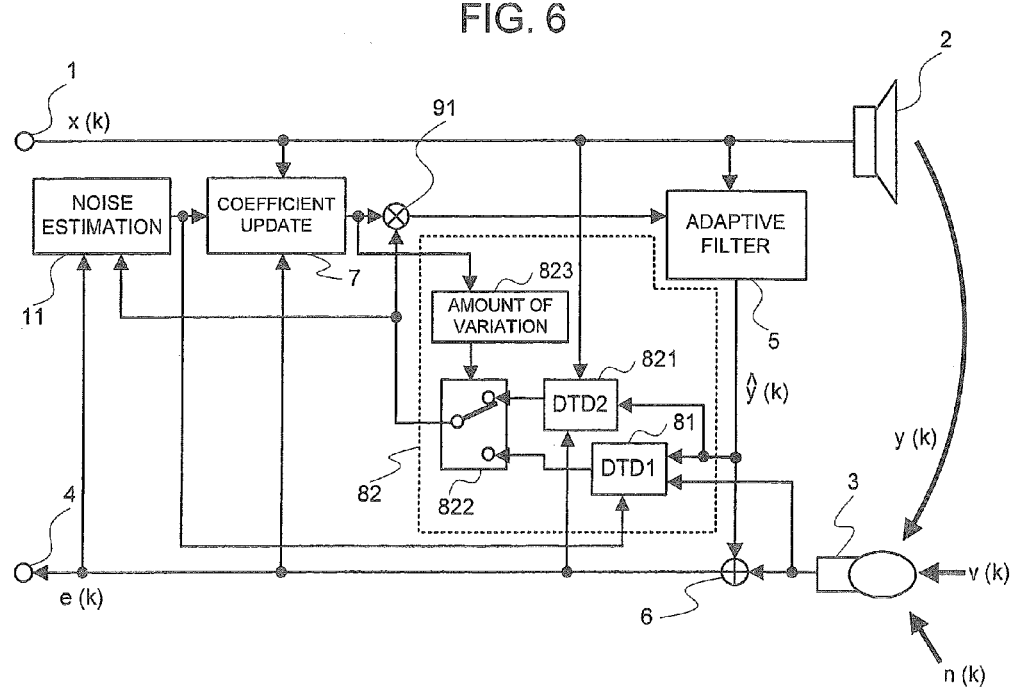
FIG. 6 A block diagram showing an embodiment 7 of the present invention.

In an embodiment 7 shown in FIG. 6, the input to the coefficient variation evaluating circuit 823 of FIG. 5 is an output of the coefficient updating circuit 7, rather than coefficient values supplied by the adaptive filter 5. Since the output of the coefficient updating circuit 7 corresponds to the second term on the right-hand side of EQ. (3), it is the very amount of coefficient variation. As described above in the embodiment 5, a square sum, a sum of absolute values, or a square sum or a sum of absolute values of part of elements with respect to the second term of the right-hand side of EQ. (3) supplied from the coefficient updating circuit 7 can be evaluated by the coefficient variation evaluating circuit 823 to thereby control the switch 822 similarly to the embodiment 5. It should be noted that obviously, control of the switch 822 using a square sum, a sum of absolute values, or a square sum or a sum of absolute values of part of elements with respect to the second term of the right-hand side of EQ. (3) as described in the embodiment 7 here is applicable to the embodiment 6 as well.

Embodiment 8

Figure 7:
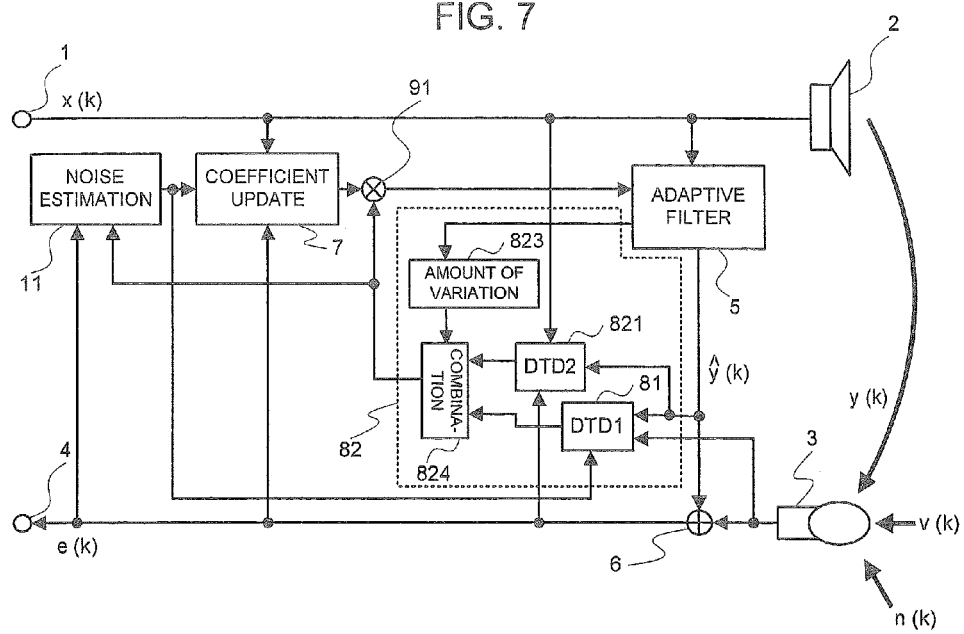
FIG. 7 A block diagram showing an embodiment 8 of the present invention.

An embodiment 8 shown in FIG. 7 comprises an information combining circuit 824 in place of the switch 822 of FIG. 5. The information combining circuit 824 calculates an output by using outputs of the double-talk detecting circuits 81 and 821 in combination according to the amount of variation (i.e., the amount to be corrected) of the coefficients for the adaptive filter 5 supplied from the coefficient variation evaluating circuit 823. The simplest operation of the information combining circuit 824 is to switch between outputs of the double-talk detecting circuits 81 and 821 according to the amount of variation (i.e., the amount to be corrected) of the coefficients for exclusive outputting, which is identical to the operation of the switch 822. Moreover, it is possible to mix the outputs of the double-talk detecting circuits 81 and 821 for outputting according to the amount of variation (i.e., the amount to be corrected) of the coefficients. The simplest mixing technique is to proportionally blend the outputs of the double-talk detecting circuits 81 and 821 according to the amount of variation (i.e., the amount to be corrected) of the coefficients. Depending upon coefficient convergence in the adaptive filter 5, smooth transition from intensive use of the double-talk detecting circuit 821 to intensive use of the double-talk detecting circuit 81 takes place. Another mixing technique is a logical sum of the outputs of the double-talk detecting circuits 821 and 81. There may be a configuration in which the output of the information combining circuit 824 becomes a single talk when either one of the double-talk detecting circuits makes decision as a single talk, and a configuration in which the output of the information combining circuit 824 becomes a double talk when either one of the double-talk detecting circuits makes decision as a double talk. Such configurations have tendency in decision to one of single talk or double talk. On the other hand, a logical product of the outputs of the double-talk detecting circuits 821 and 81 may be taken as an output of the information combining circuit 824: that is, when both the double-talk detecting circuits make decision as a single talk or a double talk at the same time, the output of the information combining circuit 824 becomes a single talk or a double talk, respectively, Several information combination techniques other than those specifically given here are possible.

Although the embodiment 4 and the embodiments thereafter are described as using the multiplier 91, it is obvious that the configuration employing the switch 9 may be used as described in the embodiments 1 to 3. Moreover, the characteristic components in the embodiments 1 to 8 are interchangeably applicable.

Embodiment 9

Figure 8:
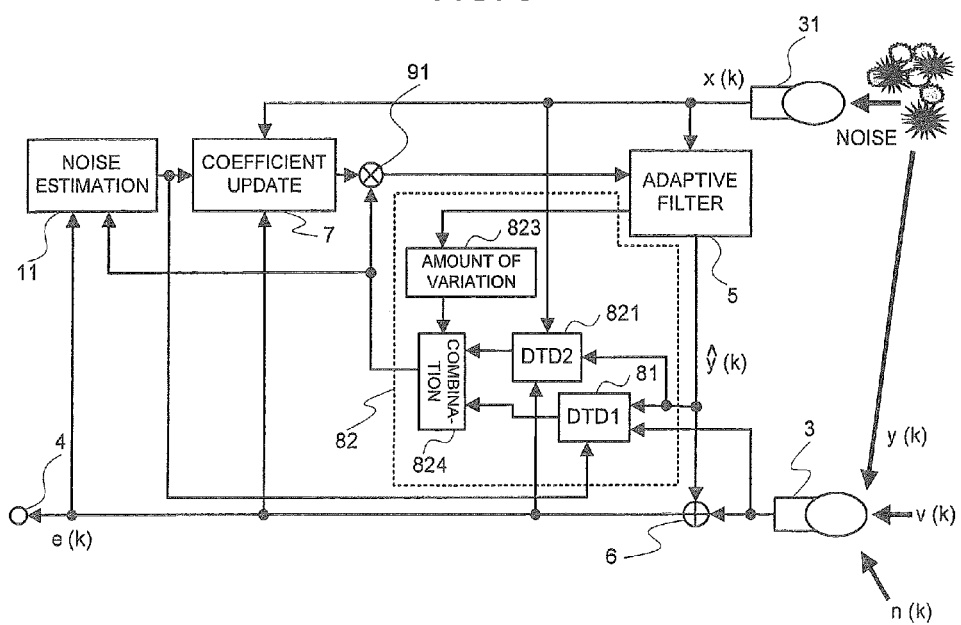
FIG. 8 A block diagram showing the configuration of an embodiment 9 of the present invention.

FIG. 8 shows an example in which the present invention is applied to a noise canceller as an embodiment 9 of the present invention.

A basic explanation of a noise canceller is found in Non-patent Document 1. A second embodiment of the present invention shown in FIG. 8 has the configuration described in Non-patent Document 1 added with the noise estimating circuit 11 and double-talk detecting circuit 82.

Moreover, comparing FIG. 8 with the embodiment 8 described above with reference to FIG. 7, the input terminal 1 is eliminated, and a microphone 31 is provided in place of the speaker 2. The noise canceller processes a noise caught by the microphone 31 with the adaptive filter 5 to thereby generate a pseudo noise y(k) hat that simulates a noise component y(k) leaking into the microphone 3, and the pseudo noise y(k) hat is subtracted at the subtractor 6 to eliminate the noise y(k) getting into the microphone 3. At that time, appropriate step-size control based on the double-talk detecting circuit 82 can be applied to the adaptive filter 5 to weaken a noise remaining in a signal obtained at the output terminal 4 and reduce distortion involved in the voice signal component. The operation and effect other than that are similar to those in the embodiment 8 described with reference to FIG. 7, and therefore, detailed description thereof will be omitted.

Embodiment 10

Figure 9:
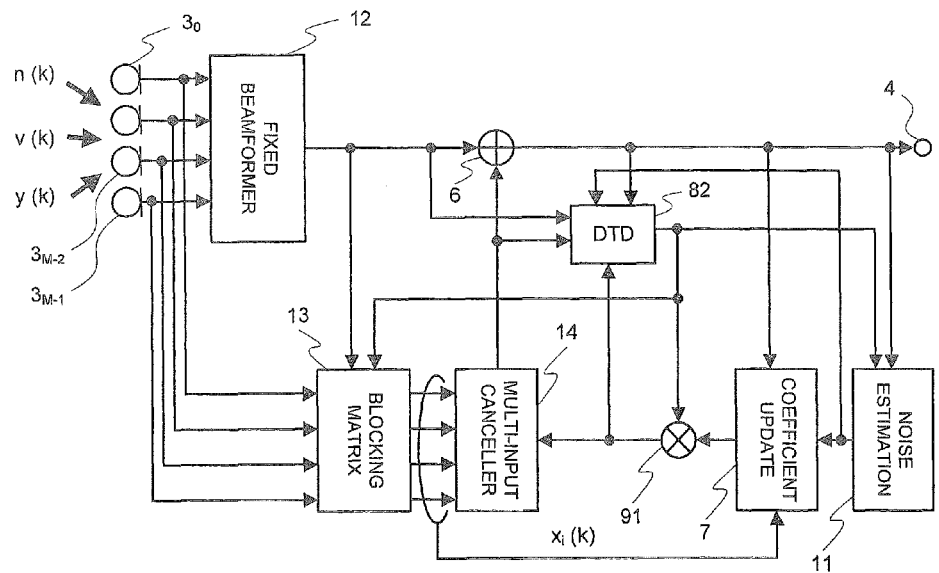
FIG. 9 A block diagram showing the configuration of an embodiment 10 of the present invention.

FIG. 9 shows an example in which the present invention is applied to a microphone array as an embodiment 10 of the present invention. A basic explanation of a microphone array is found in a paper entitled "An Alternative Approach to Linear Constrained Adaptive Beamforming," *IEEE Trans. on Antennas and Propagations*, pp. 27-34, June 1982.

The embodiment 10 shown in FIG. 9 has the configuration described in the paper added with the noise estimating circuit 11 and double-talk detecting circuit 82. Moreover, comparing FIG. 9 with the embodiment 8 described above with reference to FIG. 7, x(k) is supplied from a multi-input canceller 14, instead of the input terminal, and a signal corresponding to the microphone signal is supplied as an output of a fixed beamformer 12. The microphone array employs signals caught by a plurality of microphones $3_0$-$3_{M-1}$ and enhances a target signal v(k) by the fixed beamformer 12 to generate an enhanced signal. At the same time, the signals caught by a plurality of microphones $3_0$-$3_{M-1}$ are employed to suppress the target signal v(k) with a blocking matrix 13, and an output thereof is used to generate a pseudo signal y(k) hat of an interfering signal y(k) at the multi-input canceller 14. A signal obtained by subtracting the pseudo interfering signal from the enhanced signal at the subtractor 6 is supplied as an output to the output terminal 4. The blocking matrix 13 and multi-input canceller 14 are each comprised of a plurality of adaptive filters, and in the former, the output of the blocking matrix 13 is minimized, and in the latter, the output of the subtractor 6 is minimized. The multi-input canceller is ordinarily comprised of a number of adaptive filters, which number is equal to the number of microphones, and inputs (reference signals) to the adaptive filters are supplied by the blocking matrix 13.

Representing the reference signals as $x_0(k)$-$x_3(k)$, these reference signals $x_0(k)$-$x_3(k)$ and an error, which is an output of the subtractor 6, are used to make coefficient update for the adaptive filters. At that time, appropriate step-size control based on the double-talk detecting circuit 82 can be applied to the multi-input canceller 14 to weaken an interfering signal component remaining in a signal obtained at the output terminal 4 and reduce distortion involved in the voice signal component. In FIG. 9, the output of the double-talk detecting circuit 82 is also supplied to the blocking matrix 13. This is for the purpose of controlling coefficients using the same double-talk information because the blocking matrix 13 and multi-input canceller 14 perform coefficient update at times different from each other. Specifically, the blocking matrix 13 updates coefficients when the target signal v(k) is present, while the multi-input canceller 14 updates coefficients when no target signal v(k) is present. For this reason, information about the presence of v(k) obtained at the double-talk detecting circuit 82 can be used to appropriately control coefficient update at both the blocking matrix 13 and multi-input canceller 14. Although the blocking matrix 13 and multi-input canceller 14 basically perform coefficient update in an exclusive manner, it is possible for them to simultaneously perform coefficient update by making control using a reliability coefficient, as described above regarding the embodiment 3. The operation and effect other than that are similar to those in the embodiment 8 described with reference to FIG. 7, and therefore, detailed description thereof will be omitted.

It should be noted that Japanese Patent Application Laid Open No. H8-122424 discloses a microphone array and a beamformer having high allowance for a directional error of a target signal. The configuration disclosed therein is different from that disclosed in the aforementioned paper entitled "An Alternative Approach to Linear Constrained Adaptive Beamforming," *IEEE Trans. on Antennas and Propagations*, pp. 27-34, June 1982, in that the former employs a leaky adaptive filter or a coefficient constrained adaptive filter as the blocking matrix and multi-input canceller. Therefore, it is obvious that the double-talk detecting circuit 82 and similar techniques thereto provided in the preceding description are applicable as well.

Embodiment 11

Next, an embodiment 11 of the present invention will be described in detail with reference to the accompanying drawings.

Figure 10:
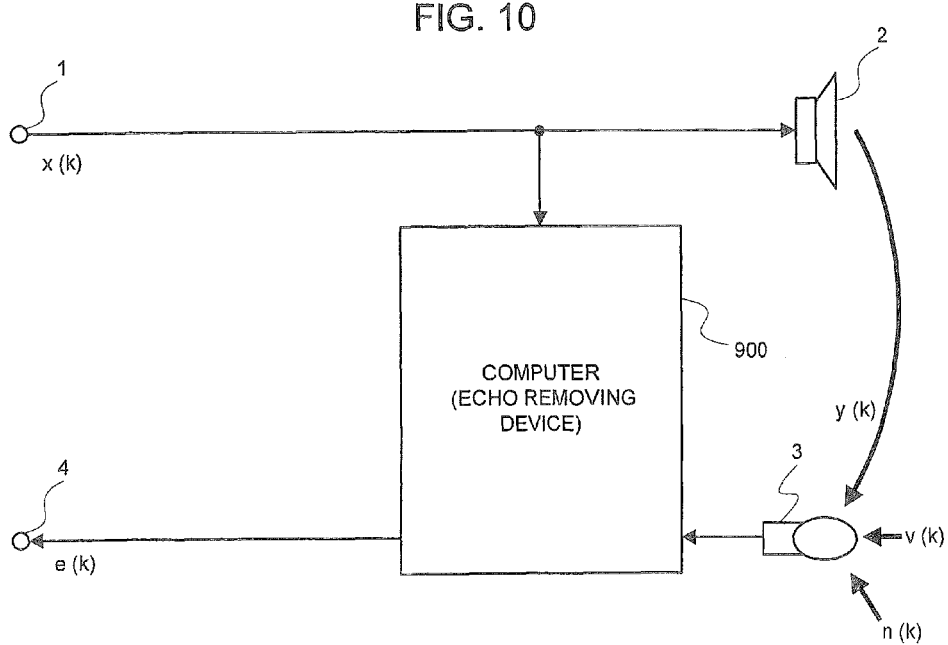
FIG. 10 A block diagram showing the configuration of an embodiment 11 of the present invention.

Referring to FIG. 10, the embodiment 11 of the present invention is comprised of a computer (central processing unit, processor or data processing apparatus) 900 operated under program control, an input terminal 1, a microphone 3, and an output terminal 4.

The computer (central processing unit, processor or data processing apparatus) 900 includes the adaptive filter 5, subtractor 6, double-talk detecting circuit 82, noise estimating circuit 11, coefficient updating circuit 7, and multiplier 91.

The adaptive filter 5 receives a reference signal supplied via the input terminal, and generates a pseudo echo. The subtractor 6 subtracts the pseudo echo from a signal supplied by the microphone 3, and transmits a result thereof to the coefficient updating circuit 7, noise estimating circuit 11, and output terminal 4. The double-talk detecting circuit 82 receives a reference signal, a signal supplied from the microphone 3, a pseudo echo that is an output of the adaptive filter 5, an output of the subtractor 6, an output of the noise estimating circuit 11, and coefficient values for the adaptive filter 5, generates double-talk information that is about the presence of a near-end signal v(k), and transmits it to the multiplier 91 and noise estimating circuit 11. The noise estimating circuit 11 receives the output of the subtractor 6 and that of the double-talk detecting circuit 82, and estimates a noise getting into a signal acquired at the microphone. The coefficient updating circuit 7 receives the reference signal, output of the subtractor 6, and an estimated noise that is an output of the noise estimating circuit 11, and determines an amount of coefficient update. The multiplier 91 receives the amount of coefficient update and output of the double-talk detecting circuit 82, multiplies them, and transmits a result thereof to the adaptive filter 5 for coefficient update.

Another mode of the embodiment 11 may have a configuration in which the computer 900 includes a function corresponding to the above-mentioned embodiments 9 and 10.

Embodiment 12

Next, an embodiment 12 of the present invention will be described in detail with reference to the accompanying drawing.

Figure 11:
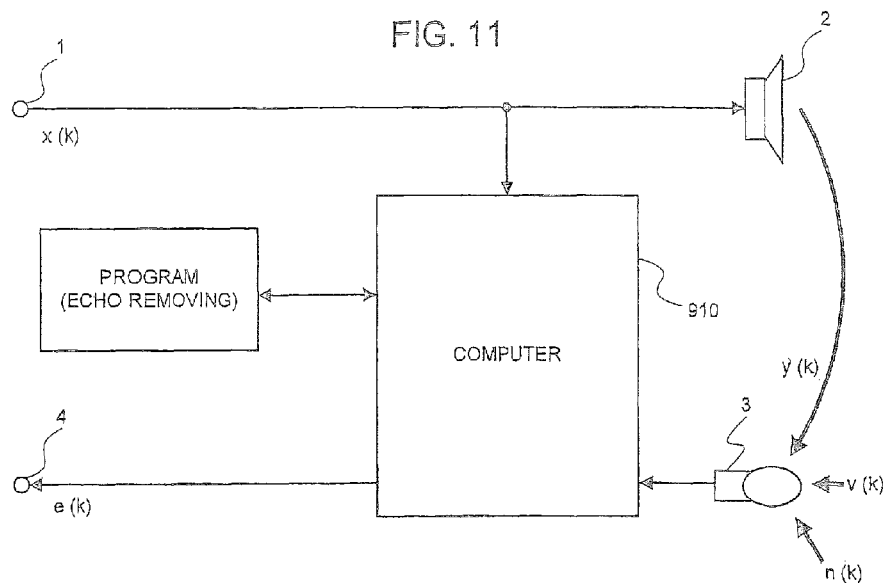
FIG. 11 A block diagram showing the configuration of an embodiment 12 of the present invention.

Referring to FIG. 11, the embodiment 12 of the present invention is shown as a configuration diagram of a computer operated by a program in which the mode for carrying out the invention described above in the embodiments 1 to 10 is implemented.

The program is read by the computer (central processing unit, processor or data processing apparatus) 910 to control the operation of the computer 910. The computer 910 executes the processing thereafter, i.e., the same processing as that by the computer 900 in the second invention of the present invention under the control of the program.

APPLICABILITY IN INDUSTRY

The present invention is applicable to several uses including: an echo eliminating system such as an echo canceller for a communication line or an acoustic echo canceller; an equalizer; an interfering signal removing system such as a microphone array or a noise canceller; their implementations such as a robot, a video conference system, a mobile phone, a speech recognition system and a hands-free system for automobiles; and a program for implementing the above in a computer as well.

The invention claimed is:

1. A signal processing method operating to generate a target blocked signal in which a target signal is suppressed by processing a mixed signal with a first set of adaptive filters, said mixed signal being received by a plurality of microphones and containing at least an interfering signal, a target signal and a noise, generate a pseudo interfering signal by processing said target blocked signal as a reference signal with a second set of adaptive filters, generate a target enhanced signal in which the target signal is enhanced by processing said mixed signal with a set of fixed filters, and remove the interfering signal by subtracting said pseudo interfering signal from said target enhanced signal, said method comprising:

estimating a noise contained in said mixed signal to determine an estimated noise;

detecting a target signal contained in said mixed signal using a value that corrected similarity with said reference signal and said mixed signal by said estimated noise to determine a value corresponding to a reliability in the detection; and adaptively controlling the degree of coefficient update for said first and second sets of adaptive filters according to said value corresponding to the reliability.

2. The signal processing method as defined by claim 1, further comprising:

when estimating a noise contained in said mixed signal, using said value corresponding to the reliability.

3. The signal processing method as defined by claim 1, further comprising:

when detecting said target signal, determining a first detection result by conducting detection according to a first detecting method;

determining a second detection result by conducting detection according to a second detecting method; and obtaining a final detection result using said first and second detection results in combination.

4. The signal processing method as defined by claim 3, further comprising:

when determining a final detection result about said target signal using said first and second detection results, using information about coefficient values of said second set of adaptive filters.

5. The signal processing method as defined by claim 3, further comprising: when determining the final detection result about said target signal using said first and second detection results, using information about variation of coefficient values of said second set of adaptive filters.

6. The signal processing method as defined by claim 3, further comprising: when determining the final detection result about said target signal using said first and second detection results, using information about the degree of convergence of said second set of adaptive filters.

7. A signal processing device comprising at least a plurality of microphones, a first set of adaptive filters for generating a target blocked signal in which a target signal is suppressed by processing a mixed signal, said mixed signal being received by said plurality of microphones and containing at least an interfering signal, a target signal and a noise, a second set of adaptive filters for generating a pseudo interfering signal by processing said target blocked signal as reference signal, a set of fixed filters for generating a target enhanced signal in which the target signal is enhanced by processing said mixed signal, and a subtractor for subtracting said pseudo interfering signal from said target enhanced signal, said device further comprising at least: a noise estimating circuit for estimating a noise contained in said mixed signal to determine an estimated noise; a double-talk detecting circuit for determining information about the presence of a target signal contained in said mixed signal using a value that corrected similarity with said reference signal and said mixed signal by said estimated noise; and a multiplier for transmitting an output of a coefficient updating circuit to said adaptive filter after correcting said output in response to an output of said double-talk detecting circuit, wherein the coefficient update for said first and second sets of adaptive filters is adaptively controlled corresponding to the output of said double-talk detecting circuit.

8. The signal processing device as defined by claim 7, wherein said noise estimating circuit estimates the noise using information obtained at said double-talk detecting circuit.

9. The signal processing device as defined by claim 7, wherein said double-talk detector comprises at least a first and a second detectors and an information combining circuit for, on receipt of outputs of said first and second detectors, determining new double-talk information by combining said first and second detector outputs, wherein an output of said information combining circuit is used as double-talk detection information.

10. The signal processing device as defined by claim 9, further comprising:

a first coefficient variation evaluating circuit for determining information about variation of coefficient values of said second set of adaptive filters, wherein said information combining circuit is controlled by an output of said first coefficient variation evaluating circuit.

11. The signal processing device as defined by claim 9, further comprising:

a second coefficient variation evaluating circuit for determining information about variation of coefficient values of said second set of adaptive filters using an output of said coefficient updating circuit, wherein said information combining circuit is controlled by an output of said second coefficient variation evaluating circuit.

\* \* \* \* \*